Figure 4:
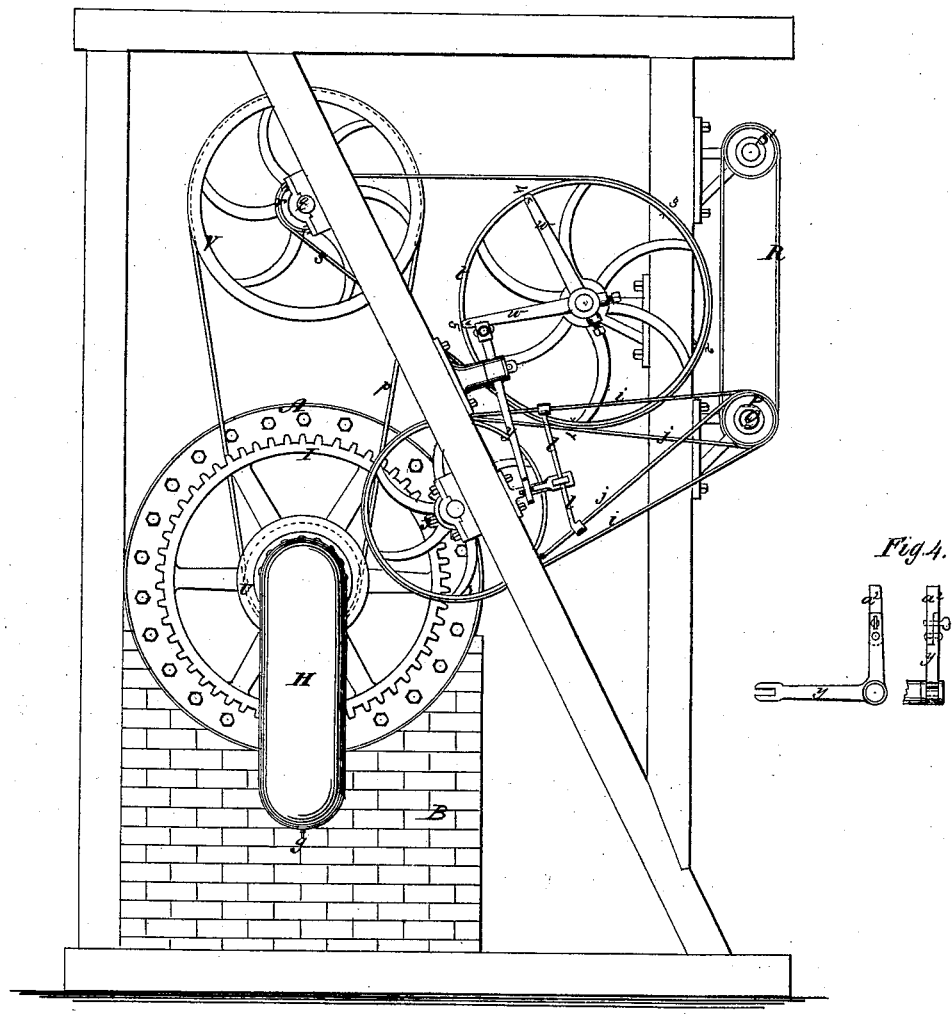

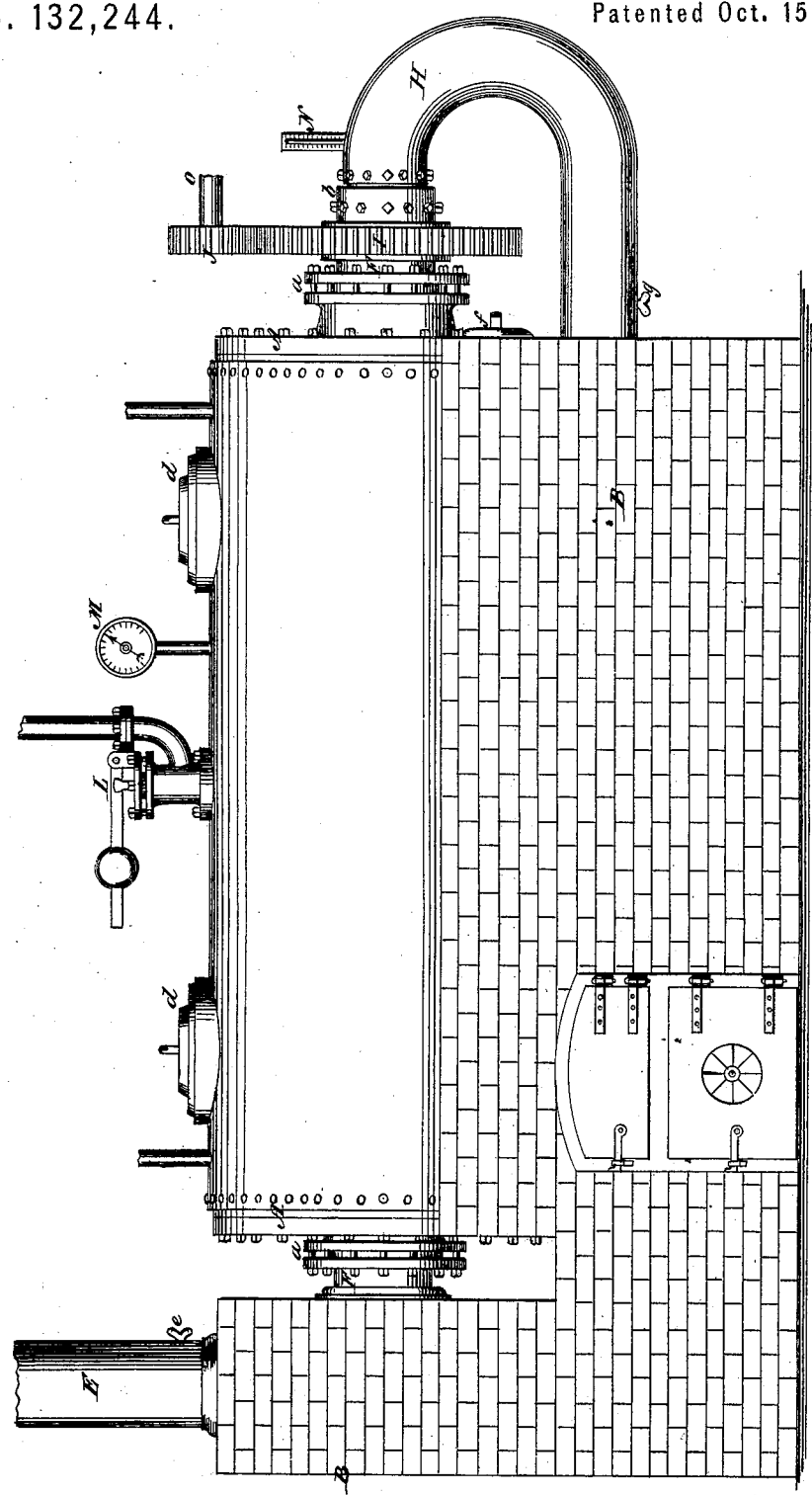

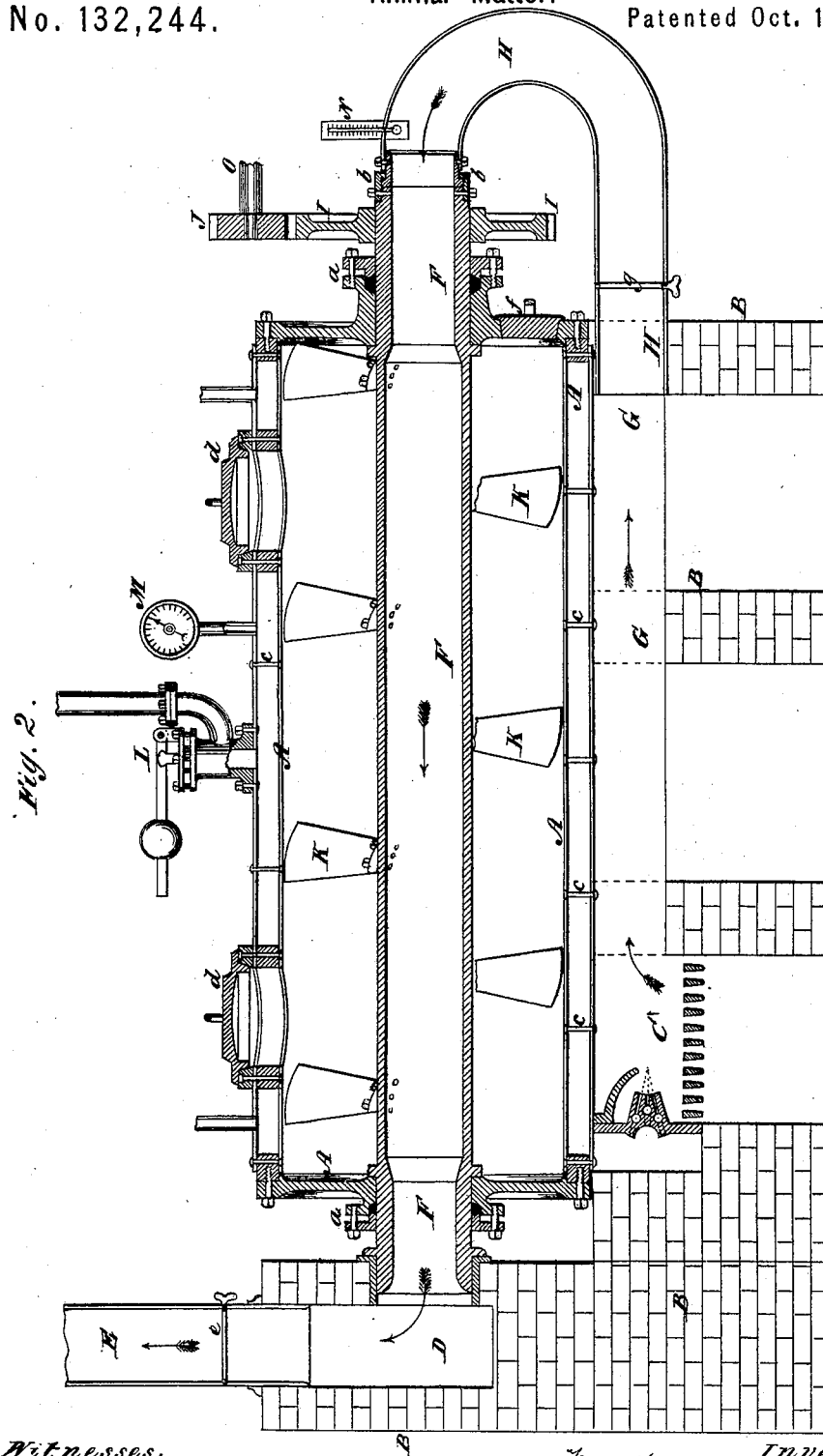
C. G. BRUCE & M. J. STEIN.
Improvement in Process and Apparatus for the Manufacture of Fertilizers from Animal Matter.
No. 132,244. Patented Oct. 15, 1872.

3 Sheets--Sheet 3.

C. G. BRUCE & M. J. STEIN.

Improvement in Process and Apparatus for the Manufacture of Fertilizers from Animal Matter.

No. 132,244. Fig. 3. Patented Oct. 15, 1872.

Witnesses:
E. Wolff
J. Felbel

Inventor:
C. G. Bruce
and
M. J. Stein
By Atty
J. N. McIntire

UNITED STATES PATENT OFFICE.

COSMORE G. BRUCE AND MICHAEL J. STEIN, OF NEW YORK, N. Y.

IMPROVEMENT IN PROCESSES AND APPARATUS FOR THE MANUFACTURE OF FERTILIZERS FROM ANIMAL MATTER.

Specification forming part of Letters Patent No. 132,244, dated October 15, 1872.

*To all whom it may concern:*

Be it known that we, COSMORE G. BRUCE and MICHAEL J. STEIN, of New York city, in the State of New York, have invented an Improved Process and Apparatus for the Manufacture of Fertilizers; and we do hereby declare that the following is a full and exact description thereof, reference being had to the accompanying drawing making part of this application.

Previous to our invention a great variety of processes for cooking and drying the scrap of fish and other animal matter have been suggested and patented, and various sorts of apparatus have been devised for carrying on the different processes; but, in all the processes and apparatus with which we are familiar, there is no means by which both steam-heat and the products of combustion from the furnace (dry heat) can be jointly employed to perform the drying process.

To accomplish the employment of the steam-heat and also utilize the products of combustion, which would otherwise be lost by passing off from the furnace, and to provide means for this and also for effecting a perfect agitation and feeding in opposite directions, automatically, of the material under treatment, are the main objects of our invention; which consist, first, in the hereinafter-described process of drying animal-scrap, &c., by the use, in one apparatus, of both steam and dry heat; and, second, in certain hereinafter-described improvements in apparatus for drying animal matters and the manufacture of fertilizers.

To enable those skilled in the art to make and use our improved apparatus and fully understand and practice our improved process, we will proceed to more fully explain the several features of our invention, referring by letters to the accompanying drawing, in which—

Figure 1 is an elevation of one of our improved cooking and drying apparatus, adapted particularly to carry out our improved process; Fig. 2 is a vertical longitudinal section through the center of the same; Fig. 3 is an end elevation, showing most particularly the automatic means for effecting the rotation, alternately in opposite directions, of the stirring mechanism; and Fig. 4 represents in detail views the hinged shipper-lever. (In Figs. 1 and 2 this mechanism is omitted to avoid complication in the drawing.)

In the several figures the same part will be found designated by the same letters of reference.

A represents a steam-jacketed drying-cylinder, or a cylindrical steam-heated vessel, which is mounted in suitable masonry, B, over a furnace, C, in about the usual manner. At the front end of the furnace-masonry is constructed a vertical flue, D, from which extends upward the smoke stack or pipe E, (that has heretofore been generally arranged at the other end of the apparatus,) and communicating with the flue D is a hollow rotatory shaft or drum, F, which passes entirely through the vessel or cylinder A, (being arranged axially therein.) From the horizontal furnace-flue G extends a curved conductor or hot-air pipe, H, which connects with the hollow shaft F at the end opposite to that which has been said to communicate with the flue D. In this manner a continuous passage is created from the furnace C, through flue G and pipe H, into the hollow shaft F, and thence through flue D to the smoke-pipe or chimney E, and all the products of combustion from the furnace have thus to travel through the hollow shaft F of the drying apparatus, as indicated by the arrows at Fig. 2. The hollow shaft or hot-air drum F is so mounted in suitable bearings in the end of cylinder A, (with stuffing-boxes at $a\ a$,) and so connected or coupled at $b$ to the stationary conductor H, that it (the said drum F) can freely rotate, and it is provided at one end with a spur-gear, I, with which engages the driving-pinion J, from which a rotatory motion is imparted in a manner and for the purposes to be presently fully explained. K K are agitators or stirring and feeding arms, which are arranged helically on the rotatory drum F, and radiate therefrom so that their ends will just turn clear of the internal face of the stationary cylinder A, as illustrated. The cylinder A is, as usual, formed of boiler-iron, with cast-iron heads; the steam-space being formed between the two cylindrical plates, which are strengthened by tie-bolts $c$. This shell-like boiler may be supplied with steam from a separate source, but is constructed so that it can generate its own steam, (which is usually preferable,) and is provided with a suitable safety-valve at L and steam-gage at M, as also with the usual man-holes $d\ d$ for the introduction of the material to be treated, and the man-hole or exit-door $f$ for the discharge of the dried and disintegrated material. In the chimney E is the damper $e$, and in the conductor or flue-pipe H is another, marked $g$, by means of which the action of the products of combustion may be regulated, as will be presently explained. N is a thermometer, arranged in connection with the conductor H near the point or locality at which it communicates with the hollow shaft F, and employed to denote the temperature of the currents passing into the said hollow shaft F. The hollow shaft F, through which the currents from the furnace pass, and which is mounted axially in the cylinder A and provided with helically-arranged feeding and stirring arms K, is, as before remarked, rotated alternately and automatically in first one and then the other direction. The objects of this rotation are to agitate and disintegrate the material being treated, and alternately feed it endwise in the cylinder A, first toward one and then toward the other end of said cylinder, by the action of arms K, and to tumble the stuff into contact with the surface of F and continuously change the relation of the heated surface of F to the particles of the mass; and the means for effecting the requisite motions of the said hollow heated shaft or drum we will now describe, referring particularly to Fig. 3. On the shaft O, to which is keyed the driving-pinion J, which meshes into the gear I, as already explained, are arranged, beside each other, one fast and two loose pulleys, from which run to the drum P, on the countershaft Q, two belts, $i\ j$, one of which is crossed, as shown. The shaft Q and its drum P receive motion through the belt R from the main driving-pulley S, and, in conjunction with the belts $i$ and $j$, is arranged a shipper-bar, $l$, which is hung to a stand, $m$, bolted to the frame-work T, and which is operated to ship the belts $i$ and $j$ on the fast and loose pulleys of shaft O, after the fashion of a planing-machine driving mechanism, so that by the continuous rotation of the drum P the shaft O will be rotated in one or another direction, according to the positions in which the belts may be placed by the shipper $l$.

The movements of the shipper are automatically effected from the rotatory shaft F itself by the following-named means: On said shaft F is a pulley, U, which belts up by a band, $p$, to the pulley V, and from the shaft $q$, on which pulley V is hung, motion is conveyed, by a small pulley, $r$, and belt $s$, to the large wheel $t$, on which are arranged arms or tappets which strike an arm connected to and operating the shipper-bar $l$. The movements of the shipper-bar $l$ are such as to effect in the rotatory shaft F the requisite number of revolutions in each direction, and these movements are controlled and effected by two arms or tappets, $w\ w$, which may be set at different distances apart, as may be desired, one of which, as the wheel $t$ revolves in one direction, strikes one end of an oscillating lever, $y$, pivoted to a stand, Z, and ships the belts to a certain position, where they remain until, by the rotation of the wheel $t$ in the opposite direction, the other arm comes in contact with the lever $y$ and so moves it as to effect an opposite position of the shipper-bar $l$ and consequent changed position of the belts.

It will be observed that the relative sizes and consequent speed of the pulleys and shafts are such that while the drum P will drive the shaft F at a comparatively rapid speed the latter will drive the wheel $t$, through the belts $p\ s$ and pulleys U V $r$, at a comparatively slow speed, the consequence of which is that while the wheel $t$ travels only part of a revolution in each direction the shaft F may be rotated several revolutions in each direction. The lever $y$, which moves the shipper-bar $l$, and which is moved first in one and then in the other direction by the arms $w\ w$ of wheel $t$, is provided with a jointed end piece, $a^2$, which can be so adjusted that the arms $w\ w$ will run clear of the lever $y$. This is necessary in order to permit the continuous rotation of the feeder-shaft F in one direction in discharging the contents of the vessel.

After the foregoing explanation those skilled will need but a brief description in order to understand the operation of our improved apparatus and the improved process to which it is particularly adapted.

The material to be heated is put into the cylinder A through the man-holes $d\ d$, as usual, which is then closed air-tight and the proper motive power applied to the main driving-pulley S. As the contents of the vessel A is subjected to the action conjointly of the steam-heated internal surface of said cylinder and the external surface of the drum F, through which the products of combustion from the furnace pass, it is at the same time kept in a state of constant agitation by the rotation of the beaters or arms K, and all its particles are successively brought into contact with the highly-heated surfaces. By the alternate rotation in opposite directions of the helically-arranged arms K the mass of material being treated is fed along endwise within the vessel A in first one and then another direction, so that no matter how unevenly the drying apparatus may be heated up throughout its length the action on the contained material will be evenized, because it is continually fed back and forth through the cylinder's length. When the contained charge shall have become completely dried and disintegrated by the action of the heated surfaces while under agitation back and forth through the vessel, (the moisture being converted into steam and passed off in the manner well known,) the man-hole $f$ is opened and the rotation of the shaft F with its feeding-arms K is continued in one and the proper direction to feed out or discharge the contents, and it will be seen that as the helically-arranged arms K run close to the internal face of the cylinder A and form a complete screw-feeder, the rotation of drum F must insure a complete clearing out of the cylinder, or the perfect and rapid discharge, through the man-hole $f$, of every particle of the charge. It will be understood that in the operation of the apparatus the action of the products of combustion may be regulated or controlled by the attendant through the use of the dampers $e$ and $g$, by means of which not only the degree of heat generated in the furnace can be varied, but also the action of the heat in the hollow shaft F. If the damper $e$ be partially closed the hollow shaft will be heated up more than when the said damper is wide open, and permits the free escape of the products of combustion. By the use of the thermometer, arranged as shown and described, the condition of the internal heating-shaft may be observed and the dampers worked accordingly. In the manufacture of guano, or fertilizer from blood, fish, and some other animal matters, the discharged mass will be in a condition for immediate use, while in other instances, where the mass contains hard matter, such as bones, for instance, which would not be sufficiently pulverized by the beaters K, the discharged mass would have to pass on to a suitable mill, to be subjected to a grinding and finishing process. It will be understood that by the adjustment of the arms of the automatic shipper-operating mechanism the feeding of the material along endwise in the cylinder may be perfectly regulated, and that this automatic mechanism may be set by the skilled manager, so that the running of the machinery and conduct of the whole operation will require little or no judgment and can be intrusted to any subordinate workman or boy.

The details of construction of the automatic mechanism for effecting, from the rotatory drum itself, the proper number of revolutions, alternately, in opposite directions, may of course be varied without departing from that part of our invention which relates to improvements in the apparatus, and the apparatus may be materially varied, or some other used, to carry out our improved process.

Having so fully described our whole invention that those skilled can readily understand and practice it, what we claim as new, and desire to secure by Letters Patent, is—

First, as an improved drying process—

The treatment of the material within a closed vessel, and under subjection to the action conjointly of the steam-heated and dry-heated surfaces, substantially as set forth.

Second, as improvements in apparatus for treating animal matters in the manufacture of fertilizers—

1. In combination with any suitable steam-heated vessel or receptacle for the material, a drum, flue, or hollow shaft, arranged within said vessel and serving as a conductor of the products of combustion of the furnace.

2. In combination with any suitable vessel or receptacle, a rotatory hollow shaft, heated by the passage through it of the products of combustion from the furnace.

3. In combination with the revolving flue F and the vessel for containing the charge, the agitating-arms for disintegrating the mass and feeding it back and forth, as described.

4. In combination with the furnace, drying-tank, and flues H, F, and D, the dampers $g$ and $e$, substantially as and for the purposes described.

5. The combination, with the tank and furnace for heating it, of a conductor and flue passing through the tank, substantially as described, whereby the products of combustion from the furnace are made to both heat the vessel and the internal hollow drum.

6. The combination, with the rotatory shaft, flue, or drum, of a drying apparatus, of a mechanism for automatically reversing the direction of rotation, substantially as and for the purposes described.

7. In combination with an automatic shifting mechanism, a means for adjustment, whereby the length of time or number of rotations of the shaft, flue, or drum, in each direction, may be varied, at pleasure, as and for the purposes described.

8. In combination with the shipper mechanism and the armed wheel for operating it, a means whereby the said operating-wheel may be made to run continuously without effecting the said shipper mechanism, as and for the purposes set forth.

9. In combination with the passage supplying the products of combustion of the furnace, of the hollow internal shaft or flue, a thermometer arranged to operate for the purposes described.

In testimony whereof we have hereunto put our hands and seals this 30th day of September, 1872.

MICHAEL J. STEIN. [L. S.]
  COSMORE G. BRUCE. [L. S.]

In presence of—
 GEO. A. GREENSWARD,
 JACOB FELBEL.